June 2, 1936.  J. W. CAIN  2,042,456
MOTOR DRIVEN WINDOW WIPER
Filed Feb. 16, 1934  2 Sheets-Sheet 1
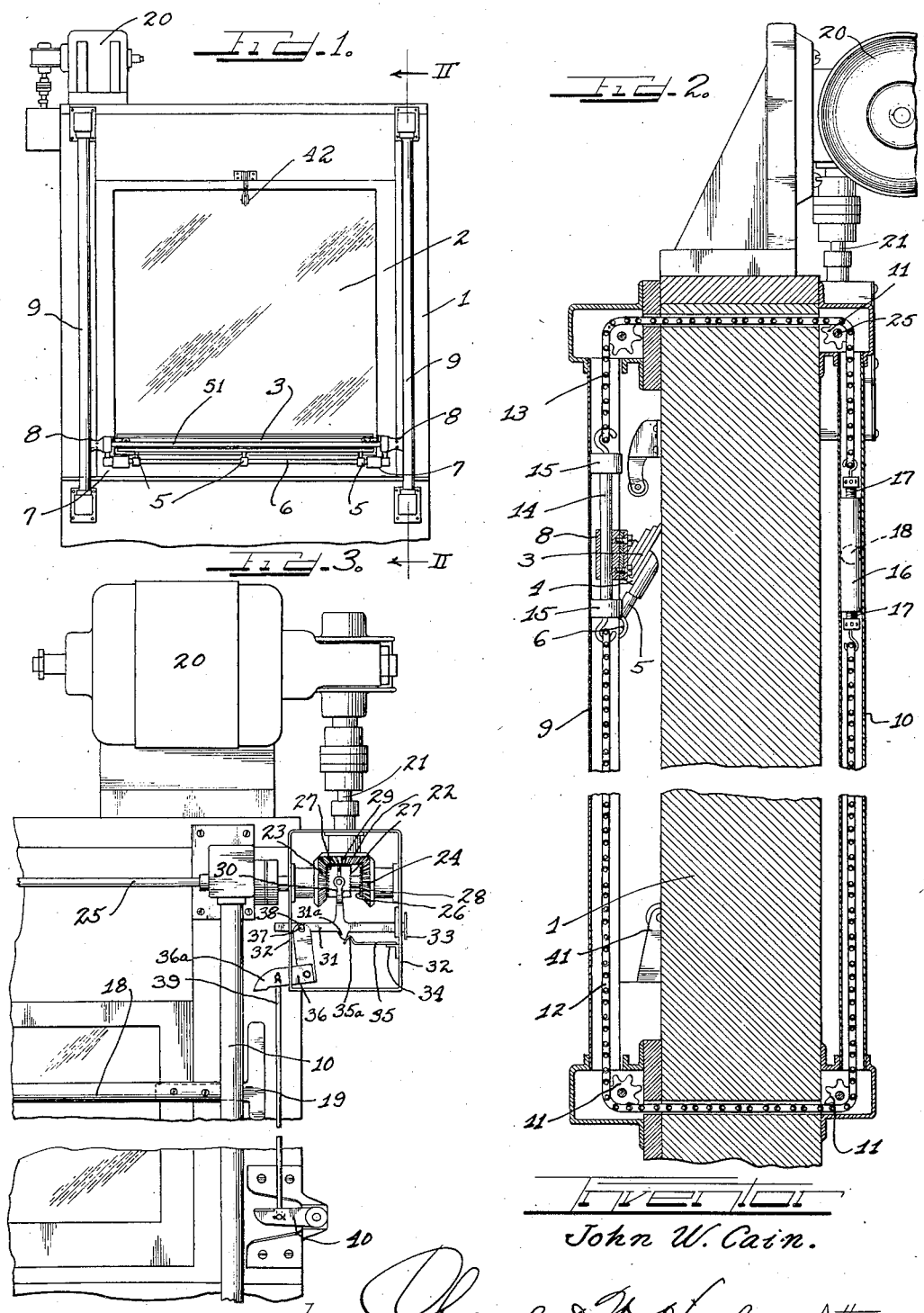
Inventor
John W. Cain.
by Charles H. Hill Attys.

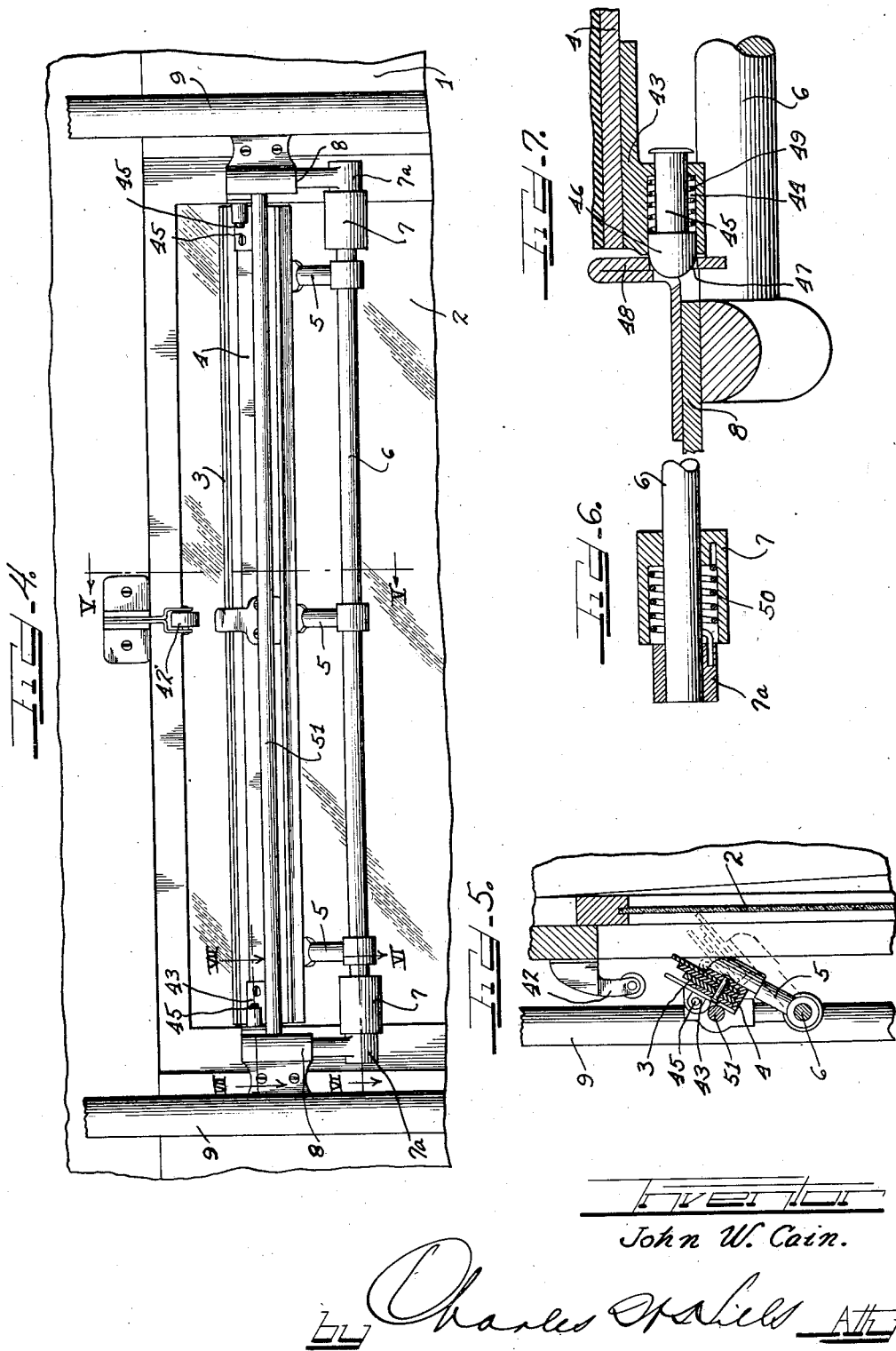

Patented June 2, 1936

2,042,456

UNITED STATES PATENT OFFICE 2,042,456

MOTOR DRIVEN WINDOW WIPER

John W. Cain, Chicago, Ill.

Application February 16, 1934, Serial No. 711,469

4 Claims. (Cl. 15—253)

This invention relates to a motor driven window wiper and constitutes an improvement of the window wiper shown in my Patent No. 1,903,439.

In the above identified patent, there is shown a reciprocating window wiper that is adapted to be manually operated. The present improvement consists primarily in providing a wiper that can be reciprocated by a source of power such as an electric motor. To this end there is provided a novel mechanism for reversing the driving mechanism for the wiper at predetermined times through the movement of the wiper operating mechanism.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is an elevational view of a window equipped with a windshield wiper involving this invention.

Figure 2 is an enlarged sectional view taken upon the line II—II of Fig. 1 looking in the direction of the arrows.

Figure 3 is an enlarged fragmentary elevational view illustrating the drive or operating mechanism for the wiper and involving this invention.

Figure 4 is an enlarged fragmentary elevational view showing the wiper in full lines upon its downward descent.

Figure 5 is an enlarged sectional view taken upon the line V—V of Fig. 4 looking in the direction of the arrows.

Figure 6 is an enlarged sectional view taken upon the line VI—VI of Fig. 4 looking in the direction of the arrows.

Figure 7 is an enlarged sectional view taken upon the line VII—VII of Fig. 4 looking in the direction of the arrows.

The invention is associated with a structure substantially similar to the structure disclosed in my above identified patents and which consists of a window frame 1 having a transparent pane 2 therein over which a wiper 3 is adapted to be reciprocated by an upward and downward movement. This wiper 3 is clamped in a plurality of clamps 4 comprising parts of arms 5 rigidly secured to a shaft 6 mounted in bearings 7a which are parts of brackets 8 slidably mounted in slots formed in upright hollow guide members 9 secured upon the frame 1 as disclosed in my above identified patent. Hollow sleeves 7 are secured to the shaft 6 adjacent the bearings 7a for a purpose that will later appear. Upon the inner side of the frame 1 are substantially similar guide members 10, one of which is shown in Fig. 2.

Above and below the guide members 9 and 10 are sprocket wheels 11 which may be mounted in any suitable manner upon the frame 1. A sprocket chain 12 is trained over each set of lower sprocket wheels 11 and the ends of the chain extend upwardly in the guide members 9 and 10. A sprocket chain 13 is trained over each set of upper sprocket wheels 11 and the ends of this chain extend into the guide members 9 and 10.

Between the ends of the chains 12 and 13 upon the outer or front side of the frame are secured rod-like links 14 upon which the brackets 8 are mounted. The ends of each rod-like link are provided with guide heads 15 that slidably fit in the guide members.

Between the ends of the chains 12 and 13 in the guide members 10 are secured rod-like links 16 which are connected to the ends of the chain by adjustable screws 17 which permit a certain amount of takeup. The links 16 carry a manually operable rod 18 by means of which the device may be manually operated. A T-head 19 is secured to an end portion of the rod 18 just inside of the guide member 10 as shown in Fig. 3. The T-head is, of course, inwardly offset to clear the guide 10 for a purpose that will later appear.

A motor 20 is mounted upon the frame 1. The motor is geared to a downwardly extending shaft 21 having a bevel pinion 22 thereon that meshes with bevel gears 23 and 24 loosely mounted upon a shaft 25 upon which a pair of the sprocket gears 11 are secured. The confronting ends of the hubs of the gears 23 and 24 are provided with clutch teeth 26 and are formed for cooperation with similar clutch teeth 27 upon a slidable clutch collar or member 28 mounted upon the shaft 25 between the gears 23 and 24.

The clutch collar 28 is provided with a groove 29 for cooperating with the yoke 30 of a shipper lever 31. This shipper lever 31 is slidably mounted in the sides 32 of a gear casing surrounding the aforementioned pinions. These sides 32 are of course, provided with suitable slots for receiving the lever. The outer end of the lever 31 is provided with a head 33 whereby the same may be manually operated. Within the gear casing, there is an angle clip 34 attached to one of the sides 32. A leaf spring 35 is attached to the angle clip directly under the shipper lever. The leaf spring is provided with an upwardly extending rib 35a adjacent its inner end that is adapted to cooperate with a teat 31a on the lower edge of the shipper lever.

Upon the frame 1, there is pivoted a bell crank lever 36 having one arm provided with a slot 37 for engaging a pin 38 on the shipper lever 31. A rod 39 is connected at one end to the other arm 36a of the bell crank lever 36 while the other end of said rod is connected to an intermediate point of an arm 40 pivoted at one end to the frame. It will be noted that the arm 40 and the arm 36a of the bell crank lever lie in the path of the T-head 19.

Upon the sill of the window, there is a deflector 41 adapted for deflecting the wiper from the window when it reaches its lower limit of movement. Above the window there is a deflector 42 for engaging the wiper with the glass at the upper limit of movement of the wiper. Means are provided for holding the wiper in a position removed from the glass when it is ascending, and for yieldingly urging the same against the glass when it is descending. These means which are shown more clearly in Figs. 4 to 7 will now be set forth.

Upon each end of the wiper clamp 4, there is secured a casting 43 having a cylindrical chamber 44 in which a spring pressed plunger 45 is mounted. Each plunger has a convex head 46 adapted to snap into an aperture 47 formed in a keeper 48 attached to the inside surface of the adjacent bracket 8. A coil spring 49 located between the inner end of the plunger head 46 and the end of the chamber normally forces the plunger outwardly. Each plunger is provided with a spring 49 so that the same are simultaneously forced outwardly for engaging their respective apertures and holding the wiper in its disengaged position.

Within the aforementioned sleeves 7 are coil springs 50 as shown in Fig. 6. One end of each spring 50 is anchored to a sleeve 7 while the other end is anchored in the bearing 7a. The springs are, of course, under tension and normally tend to rotate the shaft 6 for engaging the wiper with the window.

A guide rod 51 extending between the brackets 8 limits the outward movement of the wiper to a position where the plungers 45 may readily engage the apertures in the keepers 43.

In the operation of the device, the motor will rotate shaft 25 for driving the sprocket chains or endless members. In the position shown in Fig. 2, the wiper 3 is upon its descent and when it strikes the deflector 41, it will be thrown outwardly to the position shown in Fig. 5 allowing the plunger 46 to snap into the apertures in the keepers. At about this time, the T-head 19 will strike the arm 40 for operating the clutch shifter for reversing the clutch whereupon the wiper will be moved upwardly until it strikes the deflector 42 which forces the wiper against the window, the plungers automatically snapping out of their keepers, and the springs 50 urging the wiper against the glass. At about this time, the T-head 19 strikes the arm 36a for reversing the clutch for causing a downward movement of the wiper.

Thus it will be apparent that the wiper is automatically reversed at predetermined points and is effective for wiping the glass only when it is moving in a downward direction.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In operating mechanism for a window wiper, a wiper carriage including end brackets having apertures, a wiper pivotally mounted upon said carriage, means for reciprocating said carriage, means for deflecting said wiper from said window at a predetermined point, and spring pressed plungers associated with said wiper for automatically and releasably engaging said apertures when said wiper is deflected from said window.

2. In window wiping mechanism, a pair of slidably supported brackets, a rod carried by said brackets, a wiper clamp pivotally mounted upon said rod, means for raising and lowering said rod and wiper, said brackets having opposed apertures and spring pressed plungers on said clamp adapted for releasably engaging said apertures when said clamp is in a predetermined position.

3. In window wiping mechanism including window stiles, a bracket adjacent each stile and guided thereby, a rod carried by said brackets, a wiper clamping device pivotally mounted upon said rod, a spring pressed plunger at each end of said clamp, said bracket having opposed apertures, deflectors upon said window, and means for vertically reciprocating said clamping device and causing one deflector to swing said clamping device to inoperative position and said plungers to automatically engage in said apertures and causing the other deflector to automatically swing said clamping device to operative position and simultaneously disengaging said plungers from said brackets.

4. In operating mechanism for window wipers, a wiper carriage having a projecting portion, a wiper pivotally mounted upon said carriage, means for deflecting said wiper from the window at a predetermined point, said wiper having a projecting portion, a spring pressed plunger mounted in one of said projecting portions and the other projecting portion having an aperture for releasably receiving said spring pressed plunger.

JOHN W. CAIN.